(12) United States Patent
Christopher et al.

(10) Patent No.: US 7,809,230 B2
(45) Date of Patent: Oct. 5, 2010

(54) APPARATUS FOR SHAPING THE END OF AN OPTICAL FIBER

(75) Inventors: Anthony J. Christopher, Andover, MA (US); John C. Briggs, Lexington, MA (US); Michael Mucci, Upton, MA (US)

(73) Assignee: kSARIA Corporation, Lawrence, MA (US)

( * ) Notice: Subject to any disclaimer, the term of this patent is extended or adjusted under 35 U.S.C. 154(b) by 458 days.

(21) Appl. No.: 11/904,015

(22) Filed: Sep. 25, 2007

(65) Prior Publication Data

US 2009/0080840 A1 Mar. 26, 2009

(51) Int. Cl.
*G02B 6/00* (2006.01)
(52) U.S. Cl. .................. 385/134; 385/135; 385/136; 385/137
(58) Field of Classification Search ................ 385/134, 385/135, 136, 137
See application file for complete search history.

(56) References Cited

U.S. PATENT DOCUMENTS 7,163,343 B2 * 1/2007 Matta et al. .................... 385/88

7,457,499 B2 * 11/2008 Russert et al. .............. 385/115

OTHER PUBLICATIONS

Power Point Presentation entitled "Next Generation Manufacturing of Mil/Aero Fiber Optic Interconnect Cables" presented at the Defense Manufacturing Conference Nov. 2004.

* cited by examiner

*Primary Examiner*—Jennifer Doan
(74) *Attorney, Agent, or Firm*—Wolf, Greenfield & Sacks, P.C.

(57) ABSTRACT

An apparatus is provided for shaping an end of an optical fiber. The apparatus may include a frame and a clamp constructed to hold the optical fiber in a fixed location relative to the frame. The apparatus may further include a tip shaper supported by the frame and movable in a first direction toward and away from the clamp, and moveable in a second direction that lies in a plane transverse to the first direction to shape the end of the optical fiber when the tip shaper is placed in contact with the optical fiber. The apparatus may include an abrasive substrate which abrades the end of the fiber.

17 Claims, 14 Drawing Sheets

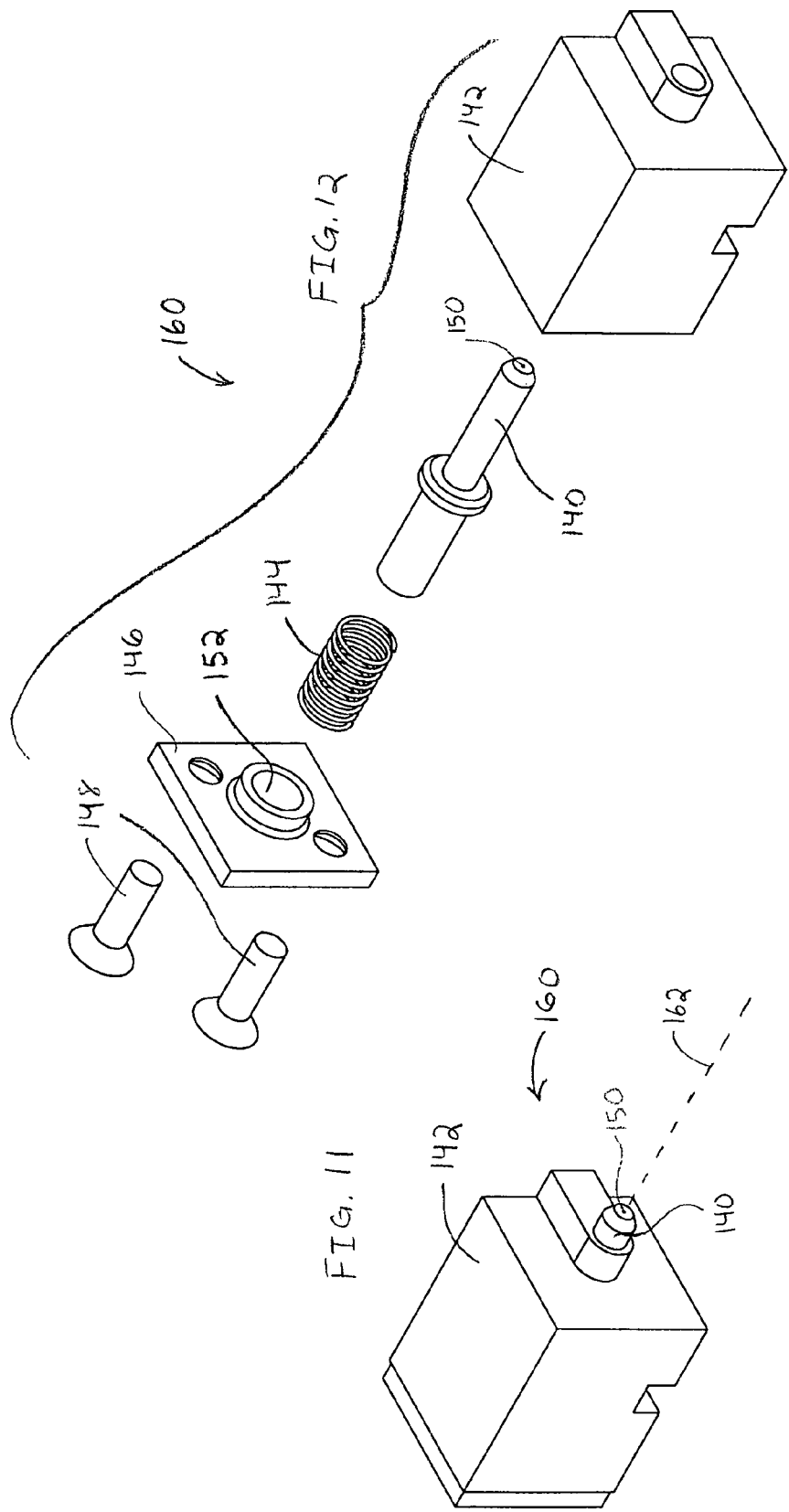

APPARATUS FOR SHAPING THE END OF AN OPTICAL FIBER

GOVERNMENT SUPPORT

This invention was made with Government support under Grant number N00014-05-M-0171, awarded by the Department of the Navy. The Government has certain rights in this invention.

FIELD OF THE INVENTION

The present invention relates to optical fibers, and more particularly, to an apparatus for shaping an end of an optical fiber.

BACKGROUND OF INVENTION

Fiber optic systems are used in a variety of applications. In a fiber optic system, information in the form of a light signal is transmitted between different portions of the fiber optic system through an optical fiber. End faces of two optical fibers may be axially aligned and placed into contact under a predetermined axial load to make a point-to-point signal connection.

To transmit the light signal through the fiber optic system, it is important for an end face of an optical fiber to have desired surface characteristics so that the end face may interface suitably with other components in the fiber optic system. An optical fiber end face that does not have desired surface characteristics may result in signal loss and degraded optical performance of the fiber optic system. In some circumstances, an optical fiber with an end surface that does not have desired surface characteristics may render the optical fiber inoperable.

It may be desirable for the end face of an optical fiber to be smooth and/or flat. In some circumstances, it may be desirable for the end face of the optical fiber to be square, such that the end face is substantially perpendicular to the axis of the fiber. In other circumstances, it may be desirable for the end face of an optical fiber to have a curved shape.

Cleaving and polishing an optical fiber are two conventional approaches to obtaining the desired surface characteristics of an optical fiber end face. Traditionally, cleaving and polishing are performed in a controlled manufacturing environment.

In a less controlled environment, such as in a field environment, it may still be desirable to process an end face to achieve desired surface qualities. For example, for various types of optical fiber repair and maintenance work, such as splicing fibers and repairing connectors, it may be desirable to process the fiber to achieve a smooth, flat, curved, and/or square end surface as part of the repair or maintenance work. However, it may be difficult to achieve these desired optical fiber end surface characteristics in an uncontrolled environment using known cleaving and polishing devices.

It is thus an object of the present invention to provide an apparatus for shaping an end of an optical fiber to provide desired surface characteristics.

SUMMARY OF INVENTION

In one illustrative embodiment of the present invention, an apparatus is provided for shaping an end of an optical fiber. The apparatus includes a frame and a clamp constructed and arranged to hold the optical fiber in a fixed location relative to the frame. The apparatus also includes a tip shaper supported by the frame. The tip shaper is movable in a first direction toward and away from the clamp and is moveable in a second direction that lies in a plane transverse to the first direction to shape the end of the optical fiber when the tip shaper is placed in contact with the optical fiber.

In another illustrative embodiment, an apparatus is provided for shaping an end of an optical fiber. The apparatus includes a frame and a tip shaper supported by the frame and moveable relative to the frame to shape the end of the optical fiber when the tip shaper is placed in contact with the optical fiber. The apparatus further includes a counterweight supported by the frame. The counterweight is constructed and arranged to maintain a predetermined force between the tip shaper and the end of the optical fiber when the tip shaper is shaping the end of the optical fiber independent of the orientation of the tip shaper.

In a further illustrative embodiment, an apparatus is provided for shaping an end of an optical fiber. The apparatus includes a frame, a clamp constructed and arranged to hold the optical fiber in a fixed location relative to the frame, and a tip shaper supported by the frame and moveable relative to the frame to shape the end of the optical fiber when the tip shaper is placed in contact with the optical fiber. The apparatus also includes a fiber support constructed and arranged to support an end portion of the optical fiber. The fiber support is movable along the end portion of the optical fiber in response to the tip shaper shaping the end of the optical fiber.

In yet another illustrative embodiment, an apparatus is provided for shaping an end of an optical fiber. The apparatus includes a frame, a clamp constructed and arranged to hold an optical fiber in a fixed location relative to the frame, and a tip shaper supported by the frame and moveable relative to the frame to shape an end of the optical fiber when the tip shaper is placed in contact with the optical fiber. The tip shaper includes an abrasive substrate having at least a first region and a second region adjacent the first region, the first region having first abrasive properties and the second region having second abrasive properties that are different from the first abrasive properties to provide different shaping characteristics along the abrasive substrate.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

In the drawings, each identical or nearly identical component that is illustrated in various figures is represented by a like numeral. For purposes of clarity, not every component may be labeled in every drawing.

Various embodiments of the invention will now be described, by way of example, with reference to the accompanying drawings, in which:

FIG. 11 is front perspective view of the fiber support assembly according to one illustrative embodiment included in the apparatus shown in FIG. 2;

FIG. 12 is an exploded view of the fiber support assembly shown in FIG. 11;

DETAILED DESCRIPTION

Figure 1:
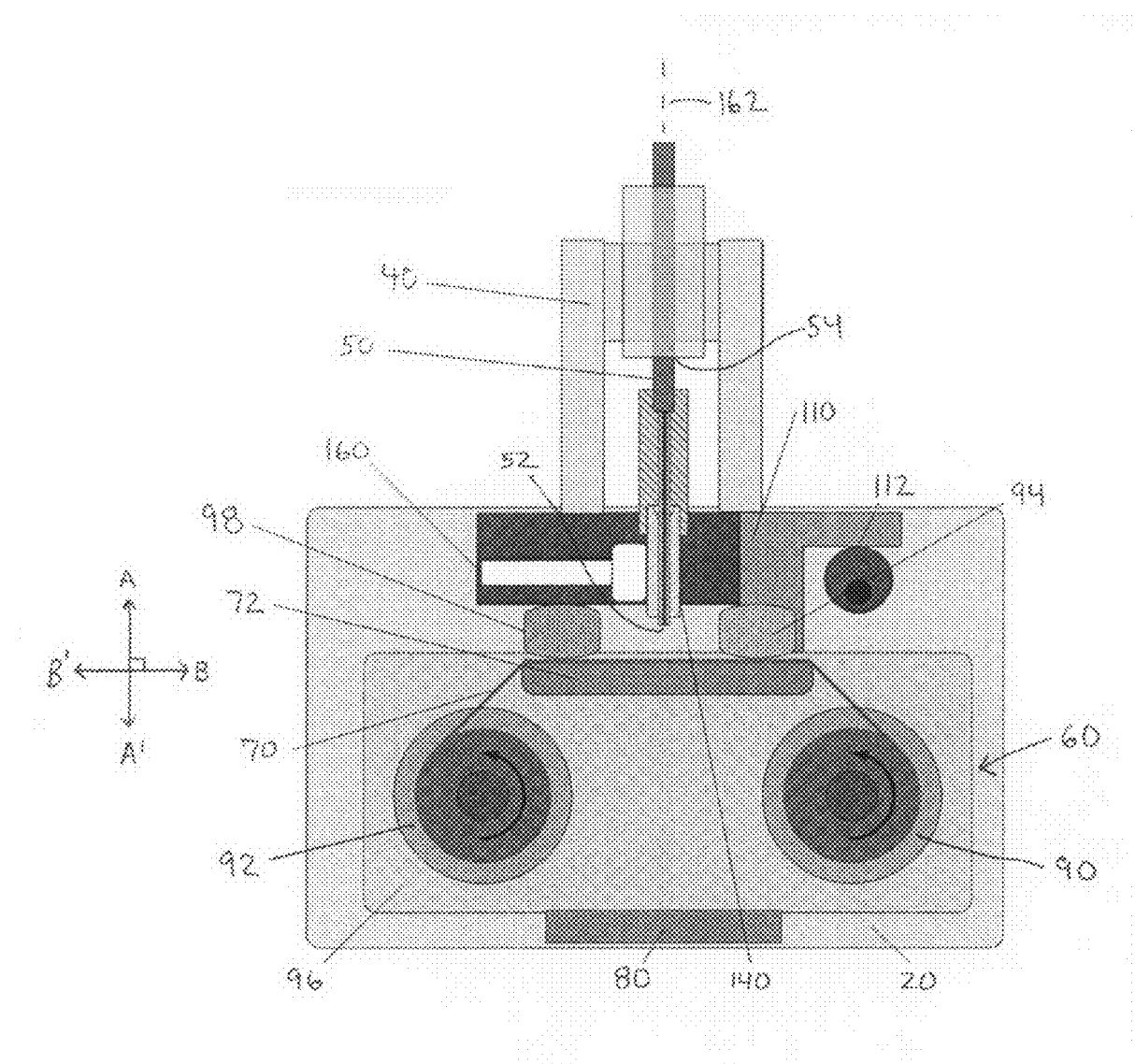
FIG. 1 is a schematic view of an apparatus for shaping an optical fiber according to one illustrative embodiment.

The present invention is directed to an apparatus for shaping the end face of an optical fiber. It should be appreciated that the apparatus may be configured in any of numerous ways, and that the present invention is not limited to the particular apparatus and techniques described below.

Aspects of the invention are directed to an apparatus which may shape the fiber to achieve desired end surface characteristics. As mentioned above, an optical fiber end face that does not have desired surface characteristics may result in signal loss and degraded optical performance of a fiber optic system. Certain embodiments are directed to an apparatus for shaping an optical fiber to obtain an end surface having one or more desired surface characteristics, including, but not limited to a flat, smooth, curved and/or square end face.

According to one aspect of the present invention, the end of an optical fiber to be shaped by the apparatus may be substantially bare (i.e., where various components, such as a ferrule or terminus have been removed, and/or coatings have been removed or stripped from the fiber). It is also contemplated that another aspect of the present invention is directed to an apparatus for shaping the end of an optical fiber which includes one or more coatings and/or components, such that shaping the end of the optical fiber may also shape portions of the coatings and/or components.

As set forth in more detail below, aspects of the present invention are directed to an apparatus which may be particularly suitable for shaping an end of an optical fiber positioned in a field environment (i.e. outside a controlled manufacturing environment), such as, but not limited to a military or industrial environment. In one embodiments, an apparatus is particularly suitable for optical fiber repair and maintenance work, such as, but not limited to, splicing optical fibers and repairing optical fiber connectors.

The apparatus of the present invention may include a tip shaper configured to shape an end of an optical fiber. The apparatus may be configured to place the tip shaper in contact with the fiber. The apparatus may include a frame which supports the tip shaper and a clamp to hold the optical fiber in a fixed location or position relative to the frame.

In one embodiment, the tip shaper may be movable in a first direction toward and away from the clamp. The tip shaper may also be movable in a second direction that lies in a plane transverse to the first direction to shape the end of the optical fiber when the tip shaper is in contact with the optical fiber. The optical fiber may remain in a fixed position and the tip shaper may both move toward the optical fiber until it contacts the fiber and the tip shaper may also move relative to the optical fiber to shape the end of the optical fiber. In one embodiment, the first direction may include linear movement. In one embodiment, the second direction may include linear movement, orbital movement, or a combination of linear and orbital movement. It is to be understood that the tip shaper may be configured to employ other movement suitable for shaping the fiber.

The tip shaper may include an abrasive substrate that shapes the optical fiber by abrading the end of the optical fiber. It should be recognized that in one embodiment, the shaping of the end of the optical fiber may be analogous to a sanding or polishing action and the abrasive substrate may include a sandpaper-like material. The tip shaper may also include a substrate support that supports the substrate and along which the abrasive substrate may be advanceable. The shape and rigidity of the substrate support may be selected based upon the desired optical fiber end face surface characteristics.

There are various factors associated with shaping an optical fiber. Factors such as the amount of force between the optical fiber and the tip shaper, the amount of time the optical fiber contacts the tip shaper, and the abrasive properties of the abrasive substrate may be adjusted to vary the amount the end of the optical fiber is shaped. In general, the greater the force between the optical fiber and the tip shaper, the greater the amount of shaping or abrading of the fiber. Similarly, the greater the time the optical fiber contacts the tip shaper, the greater the amount of shaping or abrading of the fiber. Furthermore, the more abrasive the abrasive substrate the greater the amount of shaping or abrading of the fiber. The apparatus may be configured to control one or more factors for shaping the fiber.

Illustrative embodiments of the apparatus for shaping an optical fiber may include a counterweight arrangement to maintain a predetermined force between the tip shaper and the end of the optical fiber when the tip shaper is shaping the end of the optical fiber independent of the orientation of the tip shaper or fiber. An operator may vary the orientation of the apparatus to contact and shape the end of the optical fiber. The apparatus may, for example, contact and shape an optical fiber having an upward facing end face, a downward facing end face, or any other potential orientation. The counterweight may operate to ensure that a predetermined force is applied by the tip shaper against the optical fiber regardless of the relative orientation between the tip shaper and the fiber and/or the gravitational effects on the apparatus.

Other illustrative embodiments of the present invention are directed to an apparatus for shaping an optical fiber which includes a fiber support to support an end portion of the optical fiber. The fiber support may be movable along the end portion of the optical fiber in response to the tip shaper advancing against the end of the optical fiber during the shaping process. In one embodiment, the optical fiber may be held by the clamp in a cantilevered relationship and the fiber support may be configured to provide support to the cantilevered end of the fiber.

Another aspect of the present invention is directed to an apparatus for shaping an optical fiber having a tip shaper that includes an abrasive substrate having regions with different abrasive properties. In one embodiment, the abrasive substrate may include at least a first region and a second region adjacent the first region, where the first region may have first abrasive properties and the second region may have second abrasive properties that are different from the first abrasive properties to provide different shaping characteristics along the abrasive substrate. The abrasive properties of the abrasive substrate may vary along the length of the abrasive substrate. As discussed in greater detail below, aspects of the present invention are directed to a multi-layered abrasive substrate having different shaping characteristics.

Further aspects of the invention are directed to an automated apparatus for shaping an optical fiber. An automated apparatus may enhance the effectiveness of the apparatus to shape an optical fiber and may help to minimize optical fiber damage which may result from operator error. The apparatus may include one or more automated features including, but not limited to, controlling the advancement of the abrasive substrate, controlling the movement of the tip shaper, controlling the force the tip shaper exerts against an end of an optical fiber, controlling the length of time to shape an optical fiber, and controlling the dispensing of a fluid onto the abrasive substrate. It is contemplated that in one embodiment, an automated apparatus is provided, such that once the operator actuates a trigger, no further input may be required to achieve an end face having desirable surface characteristics. However, it should be appreciated that other embodiments of the present invention may employ one or more features that are not automated.

Aspects of the invention are also directed to a hand-held apparatus for shaping an optical fiber. As the use of fiber optic systems continues to increase, there is an increasing need for a field service tool which can quickly and effectively shape an end of an optical fiber during repair and maintenance work. For example, in one embodiment, a hand-held apparatus is provided for shaping an optical fiber such that splicing and connector repair work may be performed in a field environment. It should be appreciated that each embodiment of the present invention is not limited to a hand-held device.

Turning now to the drawings, it should be appreciated that the drawings illustrate various components and features which may be incorporated into one or more embodiments of the present invention. For simplification, several drawings may illustrate more than one optional feature or component. However, the present invention is not limited to the specific embodiments disclosed in the drawings. It should be recognized that the present invention encompasses one or more embodiments which may include only a portion of the components illustrated in any one figure, and/or may also encompass one or more embodiments combining components illustrated in multiple different drawings, and/or may also encompass one or more embodiments not explicitly disclosed in the drawings.

FIG. 1 illustrates a schematic view of one embodiment of an apparatus 100 for shaping an optical fiber 50. In this illustrative embodiment, the apparatus 100 includes a frame 20 and a clamp 40 arranged to hold an optical fiber 50 in a fixed location relative to the frame 20. A tip shaper 60 is supported by the frame 20 and is movable relative to the clamp 40 and the optical fiber 50 to shape the end 52 of the fiber 50.

In one embodiment, the tip shaper 60 is moveable in a first direction which may be linear with movement toward the clamp 40 being substantially in the direction of arrow A and movement away from the clamp 40 being substantially in the direction of arrow A'. It should be appreciated that in other embodiments, the movement of the tip shaper in the first direction may be non-linear.

In one illustrative embodiment, the tip shaper 60 is also moveable in a second direction that lies in a plane transverse to the first direction A-A' to shape the end 52 of the optical fiber 50 when the tip shaper 60 is placed in contact with the optical fiber 50. In one embodiment, movement of the tip shaper 60 in the second direction may include orbital movement in the B-B' plane. It is also contemplated that movement of the tip shaper 60 in the second direction may include linear movement, and may, for example include movement of the tip shaper 60 in the direction of arrow B, in the direction of arrow B', back and forth movement in the direction of both arrow B and B', or a combination of linear and orbital movement as the invention is not so limited.

As shown, in one embodiment, the movement of the tip shaper 60 in the second direction is perpendicular to the first direction of movement A-A'. It should be appreciated that in other embodiments, the movement of the tip shaper 60 in the second direction may lie in a plane transverse to the first direction but not perpendicular to the first direction of movement.

The movement of the tip shaper 60 in the second direction shapes the end surface of the optical fiber 50 when the tip shaper 60 is placed into engagement with the optical fiber 50. In this regard, the tip shaper 60 may abrade, grind, sand, or polish the end surface. In one embodiment, repeated contact between the abrasive substrate 70 and the end 52 of the fiber 50 may shape the end of the fiber by abrading the end face to achieve desirable surface characteristics. In one embodiment, it may be desirable for the end face to be smooth and flat to optimize optical performance. In another embodiment, it may be desirable for the optical fiber to have a curved end face to optimize optical performance.

In embodiments where the tip shaper 60 is configured to move orbitally in the second direction, the tip shaper 60 may include an orbital carriage 80 coupled to the frame 20. One embodiment of an orbital carriage 80 is shown in greater detail in FIGS. 2 and 4-7. In this particular embodiment, the orbital movement of the tip shaper 60 is in a plane transverse to the axis 162 of the optical fiber.

In one illustrative embodiment, an actuator 82 such as an orbit motor, rotates a motor pulley 86 to initiate the orbital movement of the carriage 80. A drive belt 84 may extend around the motor pulley 86 coupling the motor pulley 86 to a pair of orbit drive pulleys 88 (see FIGS. 2, 4 and 5) to rotate the drive pulleys 88. In one embodiment, the orbital carriage 80 rotates due to the center of rotation of the orbit drive pulley assembly 80 being offset from the center of rotation of the orbital shafts 122. It should be appreciated that the above-described crankshaft-type mechanism is one approach to imparting orbital movement to the tip shaper 60. Other types of mechanisms and actuators apparent to one of skill in the art may be used to orbitally move the tip shaper 60 relative to the frame 20 and/or the clamp 40, as the invention is not so limited.

In one embodiment, the orbital carriage 80 may include one or more counterbalance weights 120 to reduce vibrations throughout the apparatus 100 that may be generated by the orbital movement of the orbital carriage 80. In the embodiment illustrated in FIGS. 2-5, the orbital carriage 80 includes four counterbalance weights 120 with two counterbalance weights 120 spaced apart on each end of the shafts 122. The total moment of inertia of the counterbalance weights 120 may be approximately equal to the total moment of inertia of the orbital carriage 80 and the components, such as the tip shaper 60, which orbit with the orbital carriage 80. The counterbalance weights 120 may be configured to rotate in the same direction as the orbital carriage 80, but 180 degrees out of phase, to counteract and balance out the moving weight of the orbital carriage 80.

In this illustrative embodiment, each counterbalance weight 120 is configured with a substantially half cylindrical shape. It should be recognized that the counterbalance weights 120 may be configured with other suitable shapes apparent to one of skill in the art. Furthermore, it should be recognized that not all embodiments of the present invention include counterbalance weights, as the invention is not so limited.

It should be appreciated that the orbital carriage 80 may be configured to continuously rotate the tip shaper 60 in one direction. It is contemplated that the orbital carriage 80 may be configured to rotate the tip shaper 60 in multiple directions. For example, the orbital carriage 80 may rotate in one direction, such as clockwise, and thereafter rotate in another direction, such as counterclockwise.

It is also contemplated that other types of mechanisms and actuators (not shown) apparent to one of skill in the art may be used to generate rotational movement of the tip shaper 60. Furthermore, it should be appreciated that rotational and/or linear movement of the tip shaper 60 is not required for each embodiment of the shaping apparatus.

In one illustrative embodiment, the optical fiber is held by clamp 40 such that the end 52 of the optical fiber 50 remains in a fixed location as the tip shaper 60 moves to shape the optical fiber 50. In one illustrative embodiment shown in FIG. 2, the clamp 40 includes a clamp lever 42 to secure the fiber in the clamp 40. The clamp 40 may hold the optical fiber 50 at one or more locations 54 inwardly spaced from the end 52 of the optical fiber.

In one illustrative embodiment, the clamp 40 is supported by the frame 20. In one embodiment, the clamp 40 may be detachably coupled to the frame 20 such that the clamp 40 and optical fiber 50 may be selectively coupled to the frame 20. In another embodiment, the clamp 40 may be permanently attached to or be formed as part of the frame 20. It should be appreciated that in another embodiment, the clamp 40 may be separate from the frame 20. For example, in one embodiment, the clamp 40 may be supported by another frame (not shown).

As shown in the illustrative embodiment, the tip shaper 60 may include an abrasive substrate 70 to shape the end 52 of the optical fiber 50. The abrasive substrate 70 may be configured to abrade the fiber 50 until an end surface with desired surface characteristics is achieved. In this regard, the abrasive substrate 70 may be analogous to a sandpaper-like material and may range from having a coarse surface to a fine surface depending upon the particular application. The abrasive characteristics of the abrasive substrate 70 are discussed more below, but in general, a coarser abrasive substrate 70 may result in a rough surface and may be used to abrade a greater amount of material from the optical fiber 50. In contrast, a finer abrasive substrate 70 may result in a fine surface and may be used to abrade a lesser amount of material from the optical fiber 50.

The tip shaper 60 may include at least one substrate support 72 which may be supported by the frame 20 to act as a backing layer for the abrasive substrate 70 as the abrasive substrate contacts and shapes the fiber. The substrate support 72 may include a support surface which is selected based upon the desired optical fiber end face surface characteristics. In one embodiment, a substrate support 72 may include a substantially rigid and flat support surface to create a flat optical fiber end face. In one embodiment, the substantially rigid and flat support surface may be formed from metal, such as stainless steel. In one embodiment, the substrate support 72 may include a non-planar or curved surface to create a non-planar or curved optical fiber end face. In one embodiment, the support surface of the support substrate 72 may be formed from a relatively flexible material, such as a rubber material like 60 durometer urethane, to shape the end face of the optical fiber to have a slightly curved configuration. In one embodiment, the fiber may be shaped to have a slightly convex end surface. As discussed below, the substrate support 72 may be removeable based upon the desired end face surface characteristics. In one embodiment, a plurality of substrate supports 72 may be provided to provide different optical fiber shaping characteristics and an operator may select the substrate support 72 based upon the desired optical fiber end face characteristics.

In one embodiment, the abrasive substrate 70 is advanceable along at least a portion of the substrate support 72. The abrasive substrate 70 may be advanced along the substrate support 72, such as, for example, in the direction of arrow B', to present a new or fresh portion of the abrasive substrate 70 to the optical fiber. Once a first portion of the abrasive substrate 70 contacts and shapes the optical fiber, the first portion of the abrasive substrate 70 may be advanced away from the optical fiber 50 in the direction of arrow B'.

In one embodiment, it may be desirable to advance a used portion of abrasive substrate where the abrasive particles on the surface of the substrate 70 begin to wear down. As discussed in greater detail below, in other embodiments, it may be desirable to advance the first portion of the abrasive substrate to present a new or fresh portion of the abrasive substrate which may have different abrasive characteristics. It is also contemplated that the advancement of the abrasive substrate 70 across the fiber 50 may abrasively shape the end of the optical fiber. Advancement of the abrasive substrate 70 along the substrate support 72 may be continuous or intermittent.

In one illustrative embodiment, the abrasive substrate 70 may be stored on a first reel 90 and a second reel 92. In one embodiment, a supply of fresh or unused abrasive substrate 70 is provided on the first reel 90 which acts as a feed reel. As the abrasive substrate 70 is advanced from the first reel 90, the used portion of the abrasive substrate 70 is stored on the second reel 92 which acts as a take-up reel. In this regard, at least a portion of the abrasive substrate 70 may be unwound from the feed reel 90 as the abrasive substrate 70 advances along a portion of the substrate support 72. Once a portion of the abrasive substrate 70 contacts and shapes the optical fiber, that used portion of the abrasive substrate 70 may then be wound onto the take-up reel 92.

Figure 7:
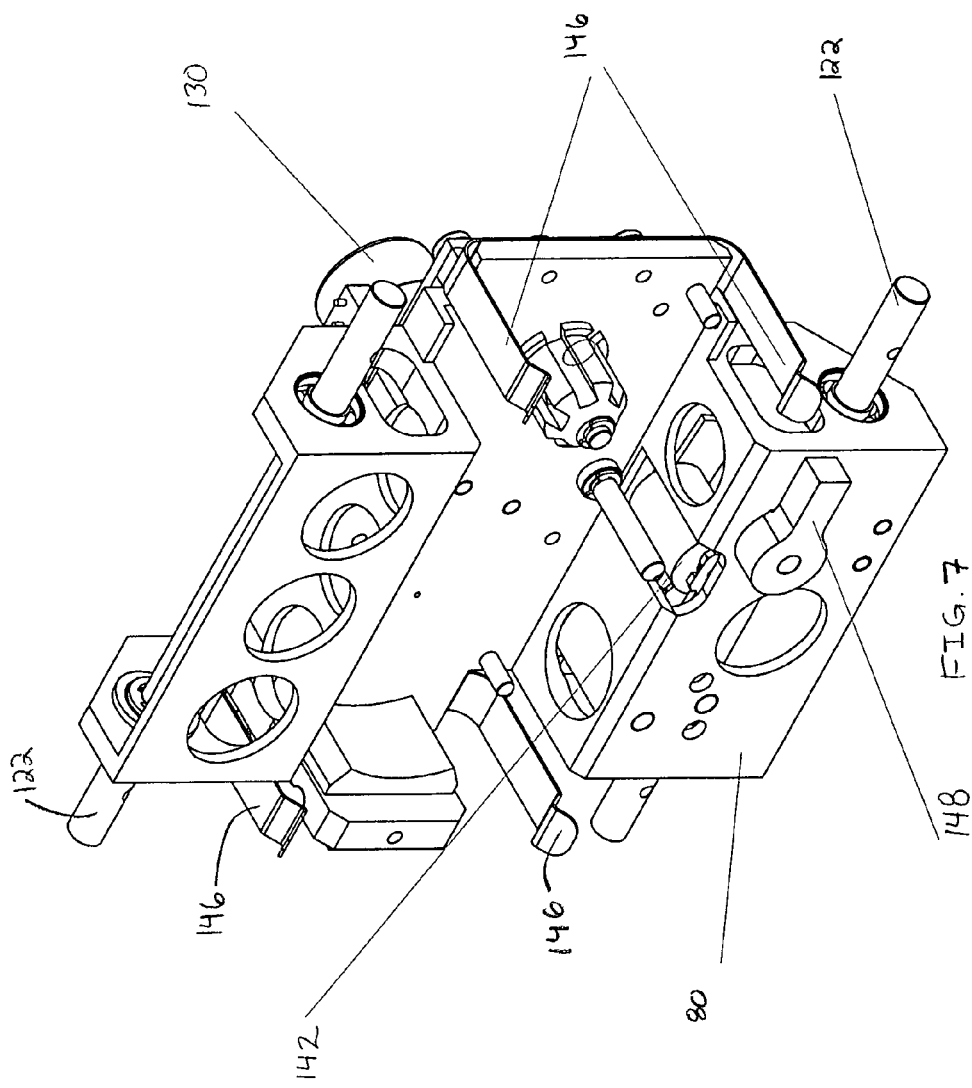
FIG. 7 is a front perspective view of the orbital carriage shown in FIG. 6.

A drive mechanism may be provided to advance the abrasive substrate 70 with respect to the substrate support 72. In one illustrative embodiment, the drive mechanism rotates the second reel 92 in a counter clockwise direction. The rotation of the second reel 92 may also draw abrasive substrate 70 from the first reel 90 which may rotate the first reel 90 in a counter clockwise direction. In one illustrative embodiment shown in FIGS. 6-7, the drive mechanism may include an abrasive substrate drive motor 130. The drive mechanism may also include a gear train 144 to move the abrasive substrate 70 at an intermittent or constant rate. As shown in FIG. 7, a pinch roller drive 142 may be provided to assist in the winding of the abrasive substrate 70 onto the second reel 92. A pinch roller engagement lever 148 may be provided to move the pinch roller drive 142 into contact with the abrasive substrate 70 once the abrasive substrate is positioned within the apparatus 100. It should be appreciated that any suitable drive mechanism apparent to one of skill in the art may be used to advance the abrasive substrate.

The tip shaper 60 may move in the first direction toward and away from the clamp 40 in a variety of ways, as the invention is not so limited. In one illustrative embodiment shown schematically in FIG. 1 and in greater detail in FIGS. 2-5 and 8, a linear carriage 110 couples the tip shaper 60 to the frame 20 to move the tip shaper 60 along the frame 20. A linear slide 114 may slideably couple the linear carriage 110 to the frame 20 such that the tip shaper 60 moves in a linear direction relative to the frame 20 and/or clamp 40 when the carriage 110 moves along the linear slide 114. In one embodiment, a cam actuator 112 (FIG. 1) produces rotary movement which is converted into the linear movement of the linear carriage 110 along the linear slide 114. It should be appreciated that other types of mechanisms and actuators apparent to one of skill in the art may be used to move the tip shaper 60 relative to the frame 20 and/or clamp 40.

Counterweight

As indicated above, it may be desirable to configure the apparatus so that a predetermined force may be maintained between the tip shaper 60 and an optical fiber 50 during the tip shaping process regardless of the orientation of the apparatus. This may be particularly advantageous for a handheld device.

Figure 2:
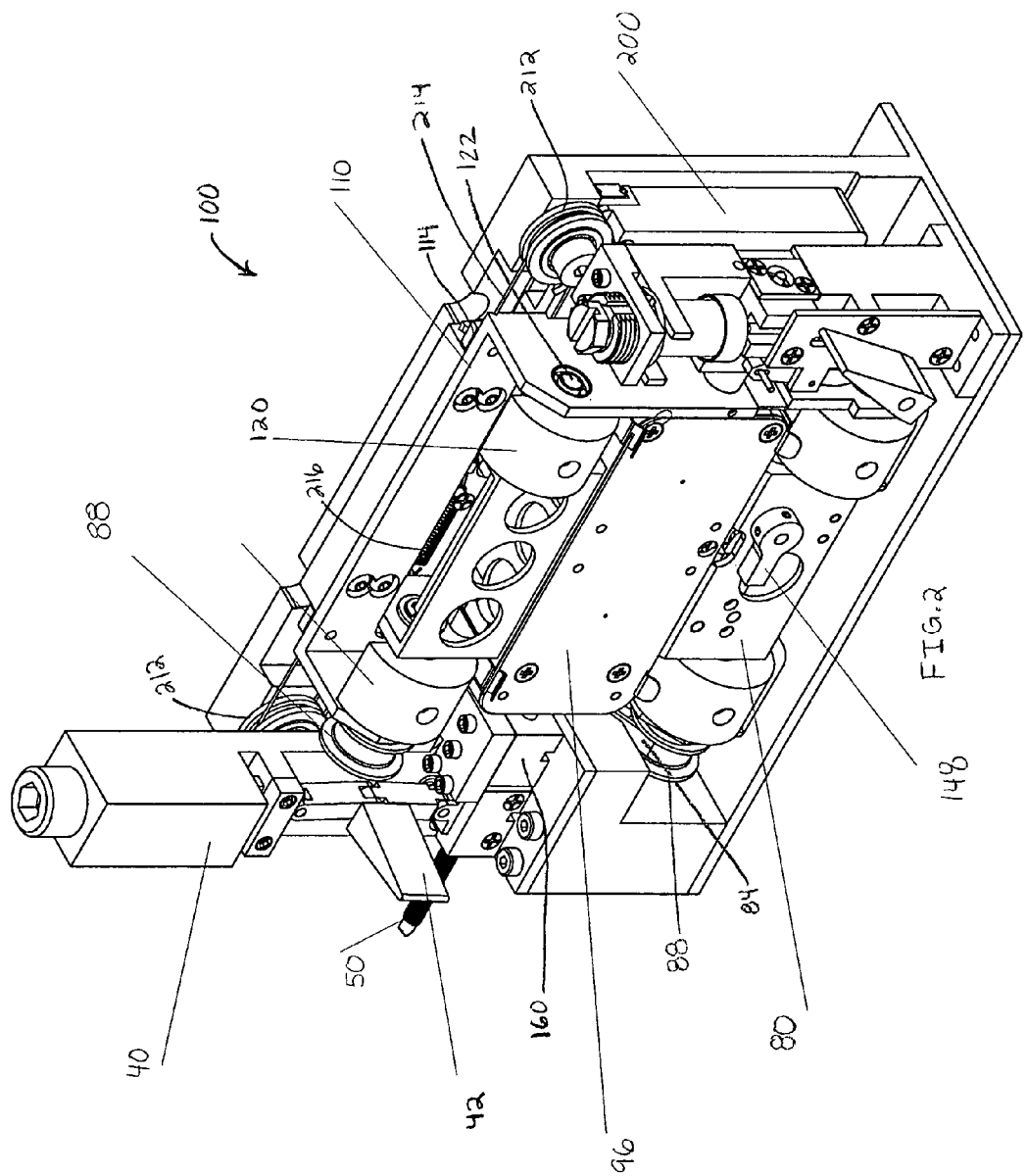
FIG. 2 is a front perspective view of an apparatus for shaping an optical fiber according to one illustrative embodiment.
Figure 3:
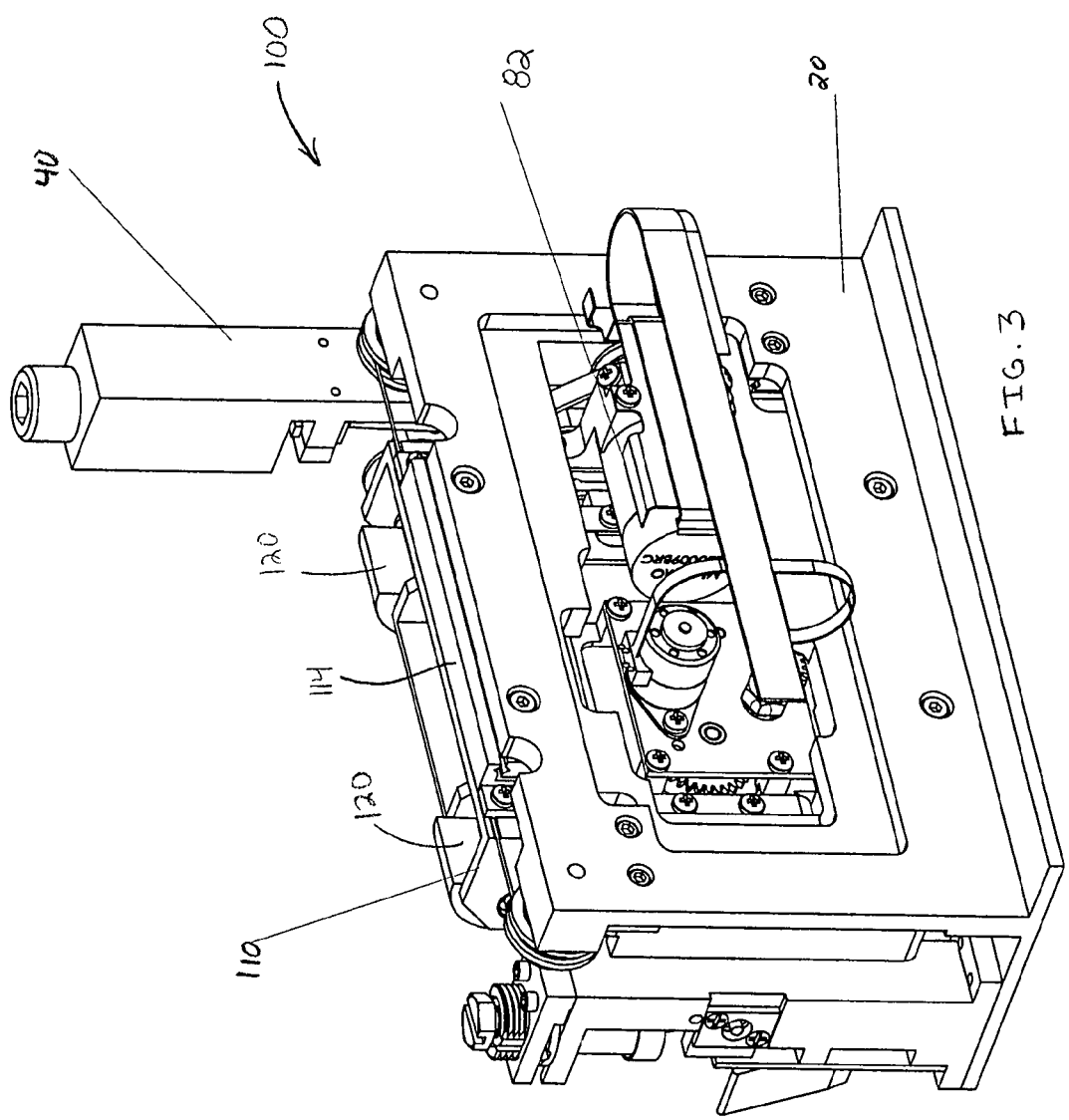
FIG. 3 is a back perspective view of the apparatus shown in FIG. 2.
Figure 4:
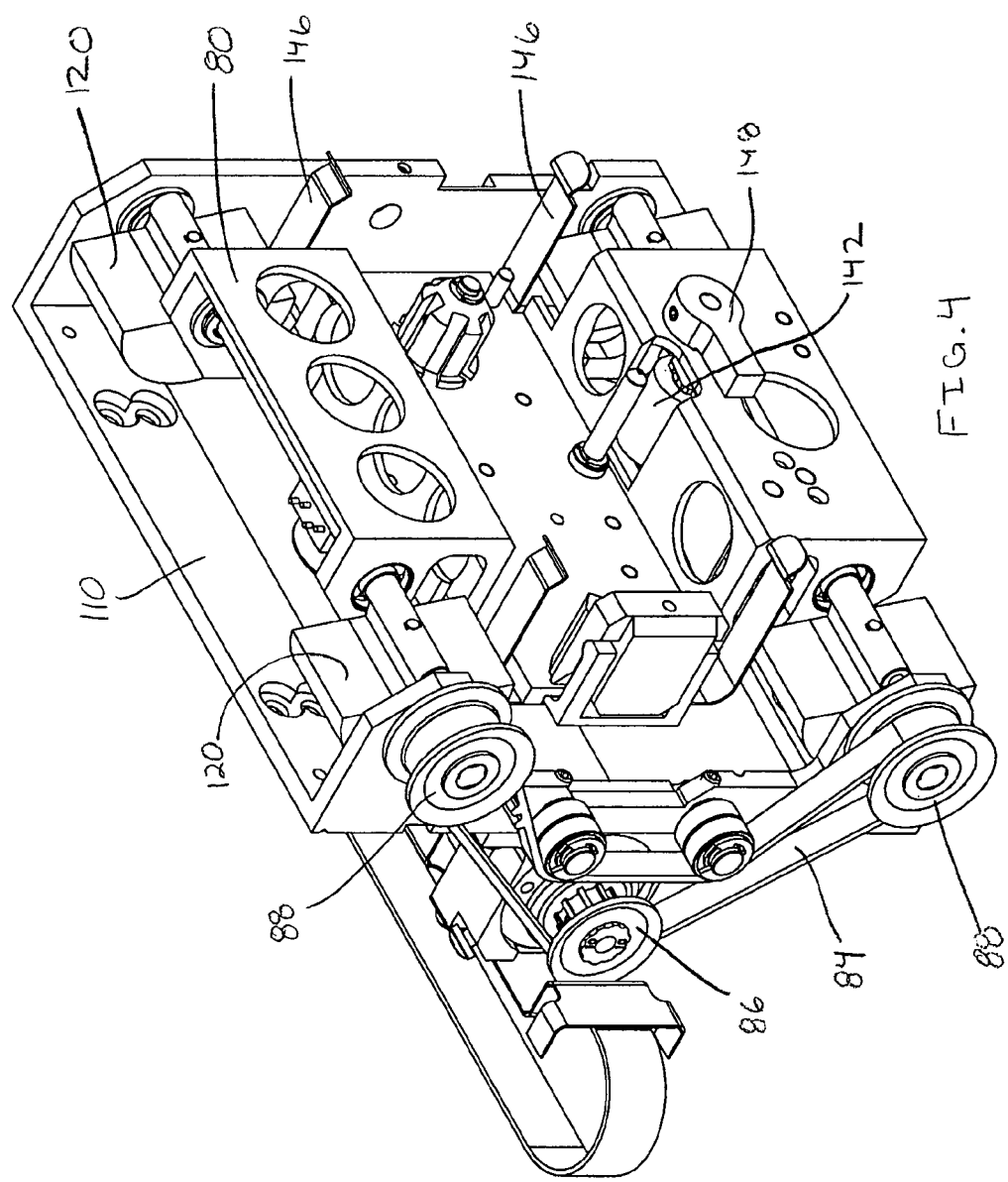
FIG. 4 is a front perspective view of the linear carriage and the orbital carriage included in the apparatus shown in FIG. 2.
Figure 5:
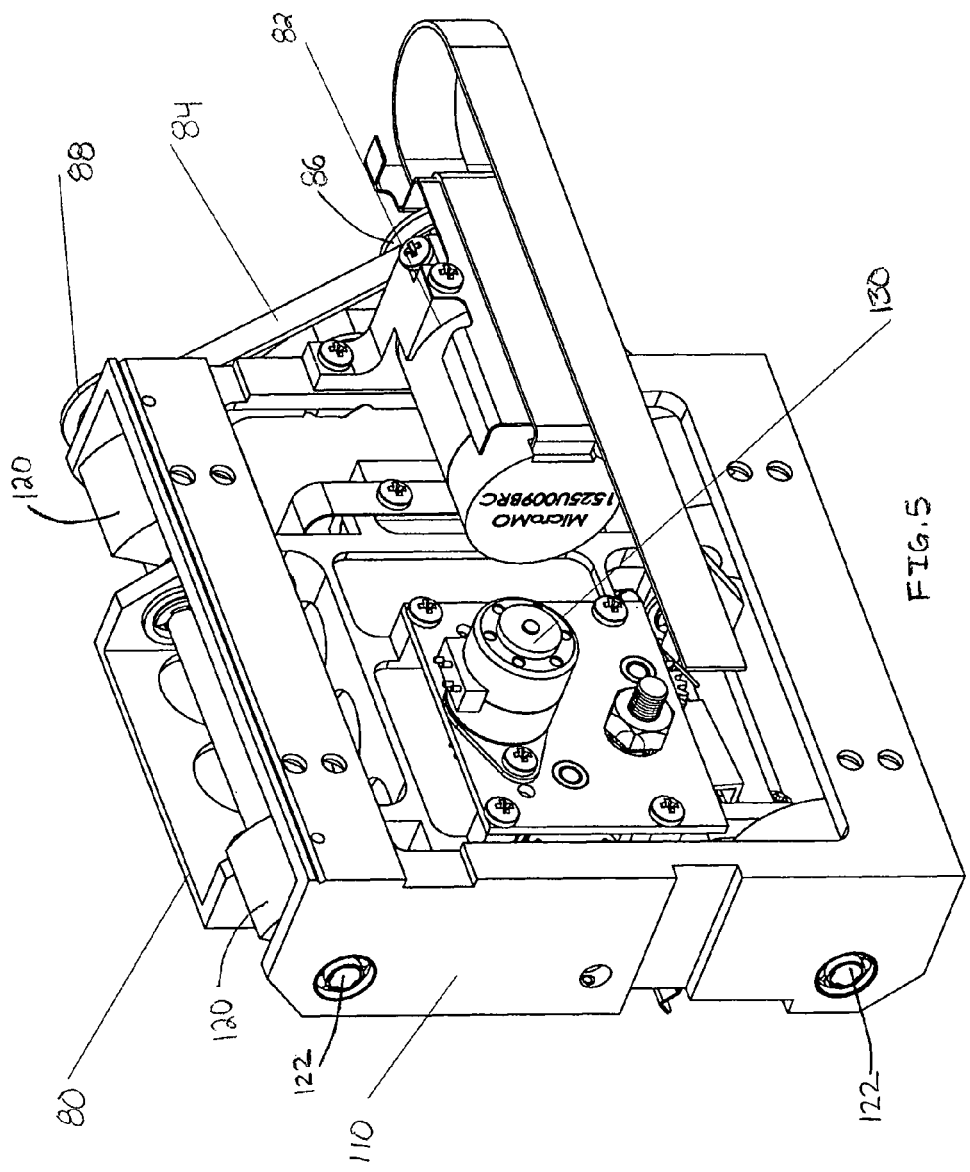
FIG. 5 is a back perspective view of the linear carriage and the orbital carriage shown in FIG. 4.
Figure 6:
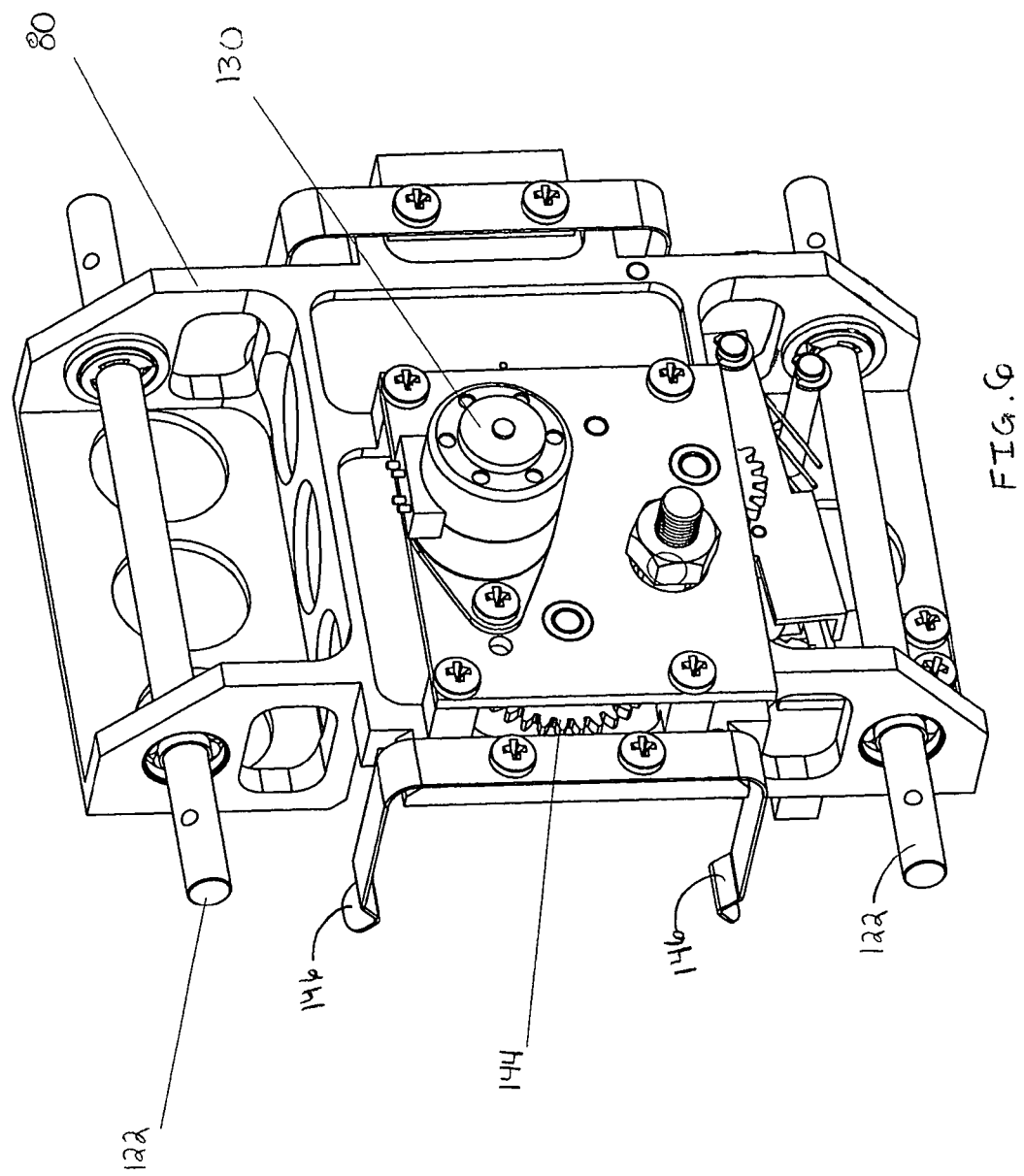
FIG. 6 is a back perspective view of the orbital carriage included in the apparatus shown in FIGS. 2-5.
Figure 8:
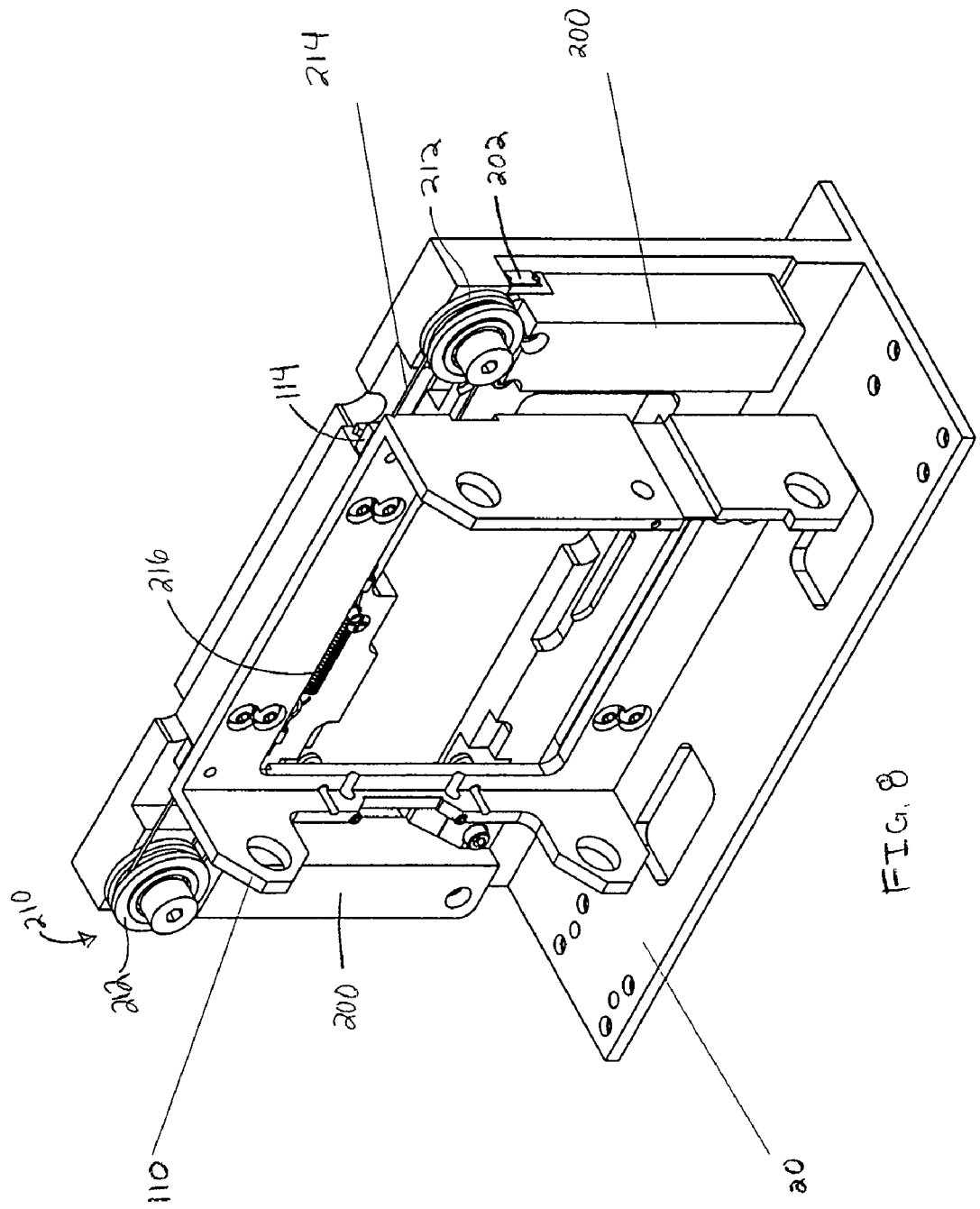
FIG. 8 is a front perspective view of the linear carriage and counterweight included in the apparatus shown in FIGS. 2-5.

As shown in FIGS. 2 and 8, aspects of the present invention contemplate an apparatus for shaping an optical fiber 50 which include a counterweight 200 supported by the frame 20. In one illustrative embodiment, the counterweight 200 is arranged to maintain a predetermined force between the tip shaper 60 and an end 52 of an optical fiber 50 when the tip shaper 60 is shaping the fiber 50. This predetermined force may be maintained independent of the orientation of the tip shaper and/or the optical fiber 50.

The orientation of the apparatus may cause gravity to affect the force between the tip shaper 60 and the optical fiber 50. For example, when the apparatus 100 is in the vertical position shown in FIG. 1 to contact a downwardly facing optical fiber end 52, gravity may decreases the force exerted by the tip shaper due to the weight of the apparatus 100 components being drawn away from the optical fiber end 52. In this orientation, the force between the tip shaper 60 and the end 52 of the optical fiber 50 may be lower than a desired force for shaping the fiber 50. This may result in the end 52 of the fiber 50 not meeting the desired end surface characteristics and/or it may increase the amount of time required to shape the fiber 50.

In contrast, when the apparatus 100 is oriented in a position to contact an upwardly facing optical fiber end 52, gravity may increase the force exerted by the tip shaper due to the weight of the apparatus 100 components being pulled toward the optical fiber end 52. In this orientation, the force between the tip shaper 60 and the end 52 of the optical fiber 50 may be higher than a desired force for shaping the fiber 50. This may result in the end 52 of the fiber becoming damaged or even broken.

In the illustrative embodiment, the counterweight 200 is provided to reduce the variation in the force between the tip shaper 60 and the end 52 of the optical fiber 50 due to gravity. In one embodiment, the counterweight 200 is moveable in a linear direction relative to the frame 20. As illustrated, a linear slide 202 couples the counterweight 200 to the frame 20. In other embodiments, the counterweight may move in a non-linear direction, as the invention is not so limited. In one embodiment, when the orientation of the apparatus 100 changes, the counterweight 200 may be configured to move along the linear slide 202.

In one embodiment, the counterweight 200 may be configured to move in response to movement of the linear carriage 110, but in the opposite direction, such that the counterweight 200 counteracts the weight of the linear carriage 110. For example, in one embodiment, if the linear carriage 110 moves 1 centimeter to the left, the counterweight may be configured to move 1 centimeter to the right to counteract this movement of the linear carriage 110. In this respect, the effect of gravity on the weight of the apparatus components, such as the linear carriage 110 and tip shaper 60, is reduced so that varied orientations of the apparatus will not adversely affect the predetermined shaping force between the tip shaper 60 and the end 52 of the fiber.

In one illustrative embodiment, a pulley system 210 is provided to facilitate slidable movement of the counterweight 200 relative to the frame 20. In the illustrative embodiment, the pulley system 210 couples the counterweight 200 to the tip shaper 60 such that the counterweight moves when the tip shaper and linear carriage move. In one illustrative embodiment, the pulley system 210 includes a pair of pulleys 212 coupled to the frame 20 at spaced apart locations. The pulley system 210 further includes a cable 214 coupled to the counterweight 200 and extending around each pulley 212. Movement of the linear carriage 110 and tip shaper 60 may generate rotation of the pulleys 212 which slidably moves the counterweight 200 relative to the frame 20 in the direction opposite the movement of the linear carriage 110. A spring 216 may be provided on the cable 214 to maintain the cable in tension regardless of the orientation of the apparatus.

Fiber Support

As indicated above, it may be desirable to support the optical fiber during the shaping process. Aspects of the present invention contemplate a fiber support 140 arranged to support an end portion of the optical fiber 50. The fiber support 140 may be moveable along the end portion of the fiber 50 in response to the tip shaper 60 shaping the end of the optical fiber 50.

Figure 13:
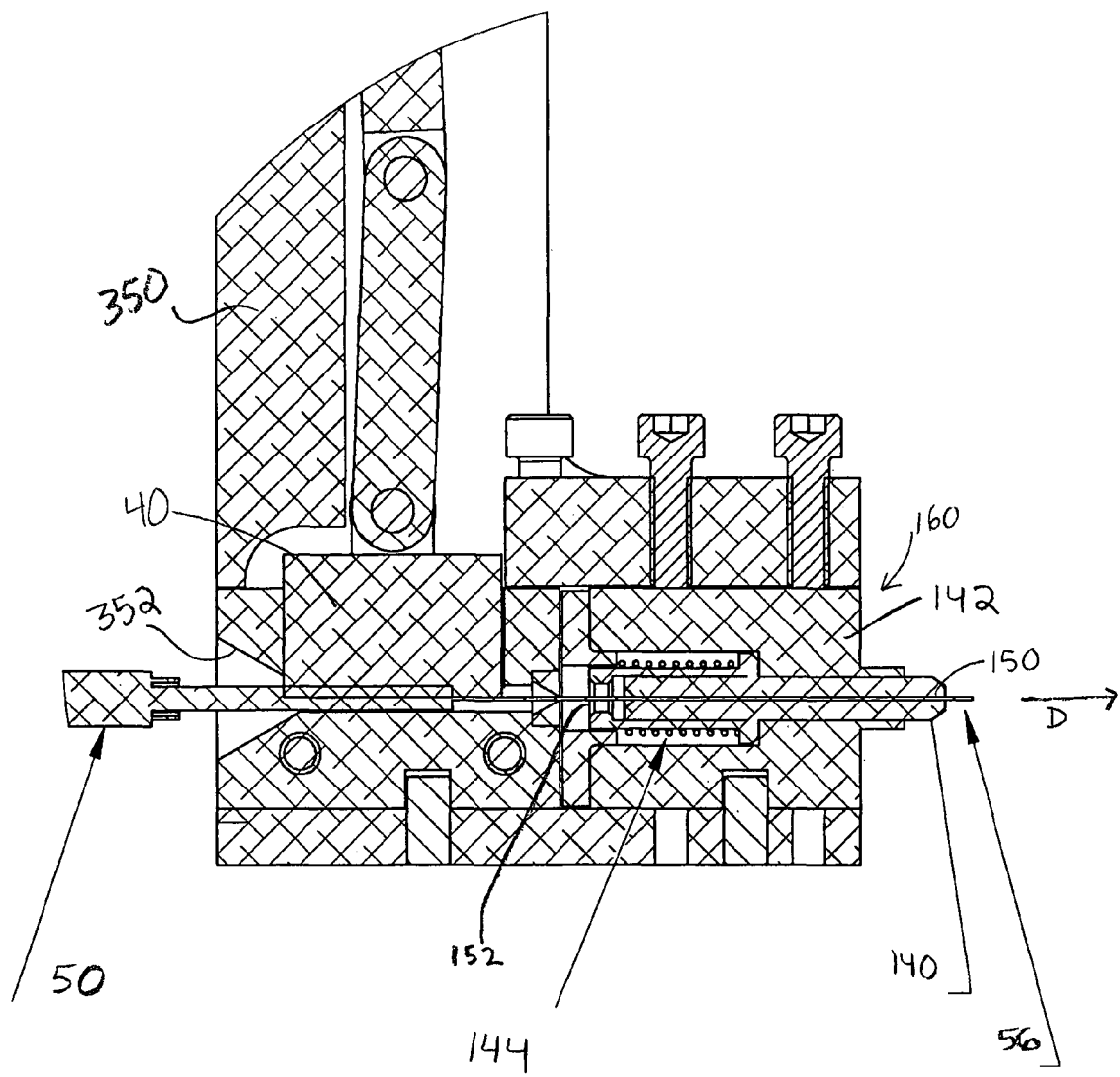
FIG. 13 is a cross-sectional view of a portion of the apparatus shown in FIG. 2 illustrating the fiber support assembly shown in FIGS. 11 and 12.

In one illustrative embodiment shown in FIGS. 11-13, a fiber support 140 is shown in greater detail. In particular, FIGS. 11 and 12 illustrate a fiber support assembly 160 in assembled and exploded views, whereas FIG. 13 illustrates the fiber support assembly 160 coupled to the clamp 40.

In one illustrative embodiment, the fiber support assembly 160 includes a fiber support 140 which may be at least partially enclosed within a fiber support housing 142.

The fiber support 140 is movable along an end portion 56 of the optical fiber 50 in response to the tip shaper 60 shaping the end of the optical fiber 50. As the tip shaper 60 contacts and abrades the fiber 50, the fiber may be worn away by the abrasion process.

In one embodiment, the fiber support 140 moves away from the tip shaper 60 once the tip shaper contacts the fiber support 140. In the illustrative embodiment, the fiber support 140 is moveable in an axial direction along the fiber axis 162, and contact by the tip shaper 60 on the fiber support 140 moves the fiber support 140 toward and into the fiber support housing 142.

The fiber support 140 is constructed to support an end portion 56 of the optical fiber 50. In one illustrative embodiment, the fiber support 140 has an axial passage 150 adapted to receive the optical fiber 50 therethrough. As shown, the fiber support may be configured to be substantially cylindrical shaped and the axial passage 150 may extend through the center of the fiber support 140. In one embodiment, the fiber support 140 may act as a floating ferrule that is slidable relative to the end portion of the optical fiber. It should be appreciated that in other embodiments, the fiber support 140 may be shaped differently as the invention is not so limited.

In one illustrative embodiment, the fiber support 140 is biased in a direction toward the tip shaper 60. As shown in FIGS. 12 and 13, a spring 144 may be provided to bias the fiber support 140 in the direction of arrow D (FIG. 13). In a relaxed position, a portion of the fiber support 140 may extend out from the fiber support housing 142. When the tip shaper 60 contacts and shapes the end of the optical fiber 50, the fiber support 140 may move along the fiber to expose the end of the optical fiber for shaping. When the tip shaper 60 moves away from the optical fiber 50, the spring 144 biases the fiber support 140 to move in the direction of arrow D to return to the relaxed position.

Figure 14:
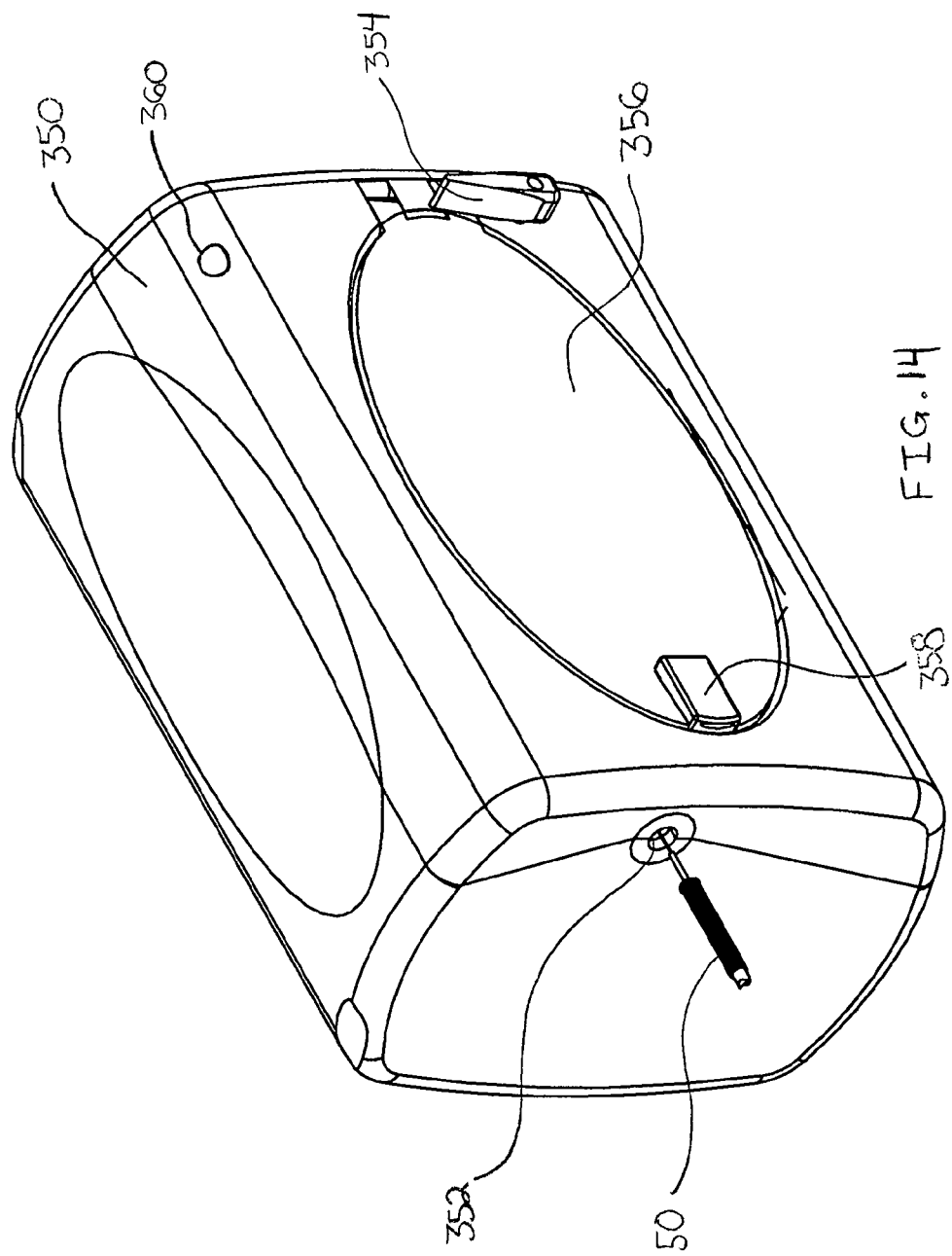
FIG. 14 is a perspective view of an apparatus for shaping an optical fiber including a housing according to one illustrative embodiment.

In one illustrative embodiment, the fiber support housing 142 may include an end cap 146 and fasteners 148 to enclose the fiber support 140 within the fiber support housing 142. The end cap 146 may include an opening 152 which communicates with the opening 352 in the apparatus housing 350 as discussed in more detail below and as illustrated in FIG. 14. It should be recognized that in other embodiments, a moveable fiber support 140 may be configured differently, and may for example be incorporated into the clamp 40.

Abrasive Substrate

Aspects of the present invention are directed to the abrasive substrate 70. The abrasive substrate 70 may be formed of various materials and includes at least one abrasive surface which is configured to shape an end 52 of the optical fiber 50. In one embodiment, the abrasive surface is formed with an abrasive diamond film. In other embodiments, it is contemplated that the abrasive substrate may be formed with other materials such as, but not limited, to silicon carbide and/or aluminum oxide.

As mentioned above, in one embodiment, the abrasive substrate 70 may be made from a material that is similar to a sandpaper-like material, and movement of the tip shaper 60, which includes the abrasive substrate 70, shapes or abrades the end of the optical fiber 50.

The abrasive characteristics of the abrasive substrate 70 may also vary based upon the particular application. A coarse abrasive substrate 70 may produce a rougher surface and may be used when a larger amount of material is desired to be abraded from the optical fiber and a fine abrasive substrate 70 may produce a smoother surface and may be used when a smaller amount of material is desired to be abraded from the optical fiber.

In one illustrative embodiment, a coarse abrasive substrate 70 may include 6 micron diamond, which is approximately equivalent to 3000 grit. In one illustrative embodiment, a fine abrasive substrate 70 may include 1 micron diamond, which is approximately equivalent to 14,000 grit. In one illustrative embodiment, a fine abrasive substrate 70 may include 0.25 micron diamond, which is approximately equivalent to 100,000 grit, and in yet another embodiment, a fine abrasive substrate 70 may include 0.1 micron diamond.

Aspects of the present invention are directed to an abrasive substrate 70 having regions with different abrasive properties. In this respect, a first region of the abrasive substrate 70 may contact and abrade the optical fiber 50, and thereafter a second region of the abrasive substrate 70 having abrasive properties which are different from the first region may contact and abrade the optical fiber 50.

In one illustrative embodiment, the abrasive substrate 70 may include a plurality of regions with different abrasive properties along the length of the substrate 70. It is contemplated that the abrasive substrate 70 may be configured to have coarse abrasive properties at one end of the substrate 70 and fine abrasive properties at the other end of the substrate 70. In this respect, it may be desirable to start off shaping the optical fiber with a coarse substrate to remove a sufficient amount of material, while ending the shaping process with a fine substrate to achieve a smooth and/or flat end surface.

It is also contemplated that the abrasive properties of the substrate may progressively change over each region. For example, in one embodiment, each region of the abrasive substrate 70 is progressively more coarse, and in another embodiment, each region of the abrasive substrate 70 is progressively more fine. Furthermore, it is also contemplated that along the length of the abrasive substrate 70 the abrasive properties of each region may vary from coarse to fine to coarse and so on.

An abrasive substrate 70 having a plurality of regions with different abrasive properties may be formed with a plurality of different abrasive materials. In one embodiment, the abrasive substrate 70 may include a base substrate with a plurality of abrasive materials fixed to a top surface of the base substrate. It is contemplated that the plurality of abrasive materials may be fixed to the base substrate with an adhesive at desired locations.

Figures 10A, 10B, 10C, 10D:
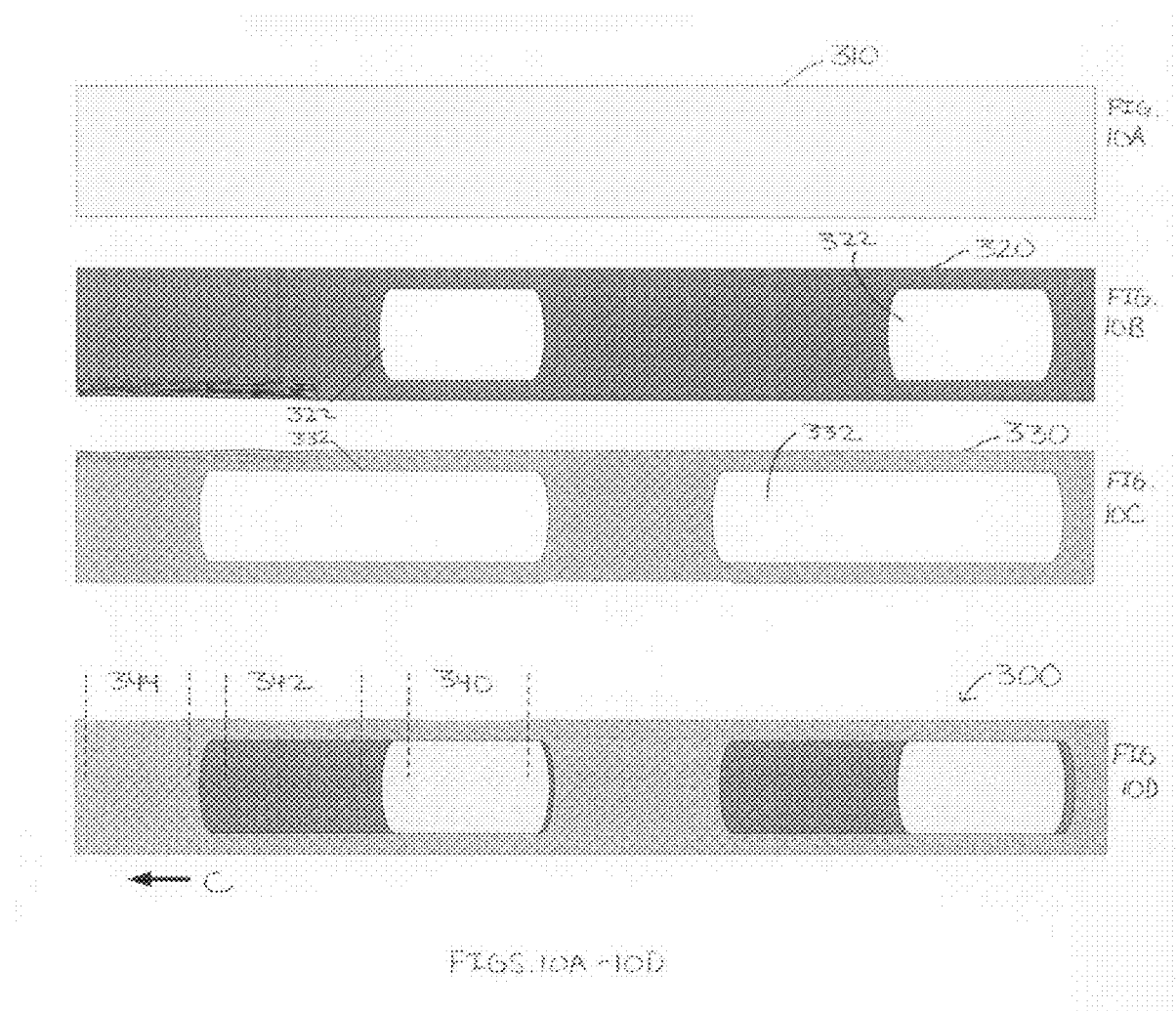
FIGS. 10A-10D are schematic views of an abrasive substrate according to one illustrative embodiment.

Turning to FIGS. 10A-10D, one illustrative embodiment of an abrasive substrate 300 will now be described in greater detail. In this particular embodiment, multiple layers of abrasive material form the abrasive substrate 300. As illustrated in FIG. 10D, the abrasive substrate 300 has at least a first region 340 and a second region 342 adjacent the first region 340. The first region 340 has first abrasive properties and the second region 342 has second abrasive properties that are different from the first abrasive properties to provide different shaping characteristics along the abrasive substrate. As illustrated, in one embodiment, the abrasive substrate 300 may further include a third region 344 adjacent the second region 342, where the third region 344 has third abrasive properties which are different from the first and second abrasive properties to provide different shaping characteristics along the abrasive substrate.

It should be appreciated that it is also contemplated for the abrasive substrate 300 to include one or more additional regions, as the present invention is not limited to a particular number of regions having different abrasive properties. It should also be recognized that an abrasive substrate having a plurality of regions with different abrasive properties may be formed with one or more layers as the present invention is not so limited.

In one illustrative embodiment, the abrasive substrate 300 includes a first layer 310 and a second layer 320 disposed over the first layer 310. The second layer 320 may have a first opening 322 extending therethrough to expose a portion of the first layer 310. In this particular embodiment, the portion of the first layer 310 which is exposed through the opening 322 forms the first region 340 and at least a portion of the second layer 320 forms the second region 342 adjacent the first region 340.

The abrasive substrate 300 may include one or more additional layers to form additional abrasive regions, if desired. In the embodiment illustrated in FIGS. 10A-10D, the abrasive substrate 300 includes a third layer 330 which is disposed over the second layer 320. The third layer 330 may have a second opening 332 extending therethrough to expose a portion of the second layer 320. In this particular embodiment, the portion of the second layer 320 which is exposed through the second opening 332 forms the second region 342 and at least a portion of the third layer 330 forms the third region 344 adjacent the second region 342.

In one illustrative embodiment, as shown in FIGS. 10A-10D, the plurality of regions 340, 342, 344 having different abrasive properties may be repeated along the length of the abrasive substrate 300. When the apparatus 100 is configured such that the abrasive substrate 300 is advanced toward the optical fiber in the direction of arrow C, an end 52 of the optical fiber 50 may first contact and be shaped by the third region 344 of the abrasive substrate 300. Thereafter, the substrate 300 may be advanced along the substrate support 72 such that the end of the optical fiber 50 contacts and is shaped by the second region 342, which may be followed by the substrate 300 being advanced such that the fiber contacts and is shaped by the first region 340. After the optical fiber contacts the first region 340, the substrate 300 may continue to be advanced in the direction of arrow C and the optical fiber may next contact and be shaped by another third region 344, followed by another second region 342 and another first region 340. The apparatus may be configured to employ one or more of such cycles to shape the tip of one optical fiber and/or to shape the tips of a plurality of optical fibers.

In one illustrative embodiment, the third layer 330 includes a coarse abrasive surface, the second layer 320 includes a medium abrasive surface, and the first layer 310 includes a fine abrasive surface. Thus, as the substrate 300 is advanced in the direction of arrow C, the optical fiber is shaped by regions which go from coarse to fine. In one illustrative embodiment, the third layer 330 may include 6 micron diamond, the second layer 320 may include 1 micron diamond and the first layer 310 includes 0.1 micron diamond. It should be appreciated that in other embodiments, the regions and layers of the abrasive substrate 300 may be arranged differently and employ various levels of coarseness or fineness, as the invention is not so limited.

The type of material used for the abrasive substrate 300 will also vary on the type of material being shaped by the apparatus. As mentioned above, the end of the optical fiber to be shaped by the apparatus may be substantially bare (i.e., where various components, such as a ferrule, and coatings have been removed or stripped from the fiber), or the fiber may include one or more coatings and or components, such that shaping the end of the optical fiber may also shape the coatings and/or components. An optical fiber having various coatings and/or components may require a different type of abrasive substrate material than a bare optical fiber. In particular, an optical fiber that includes coatings and/or other components, such as a ferrule fixed to the end of the fiber 50, may require a coarse abrasive substrate to shape the end face.

It may be desirable to moisten the abrasive substrate 70 with a fluid. Various types of fluids may be used to wet the abrasive substrate 70 as the present invention is not limited in this respect. In one illustrative embodiment, an abrasive substrate 70 may require an activation fluid which may transfer the abrasive substrate 70 into a slurry. In one illustrative embodiment, a coarse abrasive substrate may require a lubrication fluid. In one illustrative embodiment, a fluid may be used to clean the optical fiber after the abrasive substrate 70 shapes the fiber 50. In such embodiments, the tip shaper 60 may include a fluid dispenser 94 (FIG. 1) configured to dispense a fluid to wet at least a portion of the abrasive substrate 70 with the fluid.

In some situations, it may be desirable to remove the fluid from the abrasive substrate 70 and/or the end face 52 of the optical fiber. For example, a fluid may also act as a contaminant itself. Therefore, according to one embodiment, the tip shaper 60 may include a fluid collector 98 (FIG. 1) configured to collect a portion of the dispensed fluid. In one illustrative embodiment, the fluid collector 98 may include a sponge-like material that collects the fluid by absorbing fluid from the substrate into the sponge-like material.

It should be recognized that the apparatus 100 may not include a fluid dispenser 94 and/or a fluid collector 98, as the invention also contemplates the use of abrasive substrates 70 which do not need to be moistened.

Automation of Shaping Apparatus

Aspects of the present invention are directed to an automated apparatus for shaping an end of an optical fiber. An apparatus with one or more automated features may enhance the effectiveness of achieving an end face with desirable surface characteristics during repair and/or maintenance work.

In one illustrative embodiment shown in FIG. 14, the apparatus 100 may include a housing 350 configured to allow an operator to hold the device. In one embodiment, the apparatus is a handheld device so that an operator may more easily use the apparatus in a field environment to repair an optical fiber and the housing 350 may be shaped to fit within an operator's hand. The housing 350 may include an opening 352 which is adapted to receive an optical fiber to initiate the tip shaping process and the operator may align and insert the end 52 of the optical fiber 50 into the opening 352.

In one illustrative embodiment, when the apparatus 100 is aligned with the end of the optical fiber, an operator may actuate a trigger 354 to actuate an automatic shaping process or cycle. Once the shaping process is actuated, the operator holds the apparatus 100 until the shaping process is completed. The apparatus 100 may include an indicator 360, such as an LED, which signals to the operator that the process is complete, such that the operator will know when he/she can remove the shaping apparatus 100 from the optical fiber.

An automated device may be advantageous by allowing less skilled technicians to prepare fiber ends for subsequent processing. In this regard, once the operator actuates the trigger 354, no further input may be required to achieve an end face having desirable surface characteristics.

It is contemplated that one or more processes may be automated, including, but not limited to, movement of the tip shaper 60 in the first direction toward and away from the clamp 40, movement of the tip shaper in the second direction in a plane transverse to the first direction to shape the optical fiber, advancement of the abrasive substrate along at least a portion of the substrate support 72, and application of the fluid to the abrasive substrate.

Figure 15:
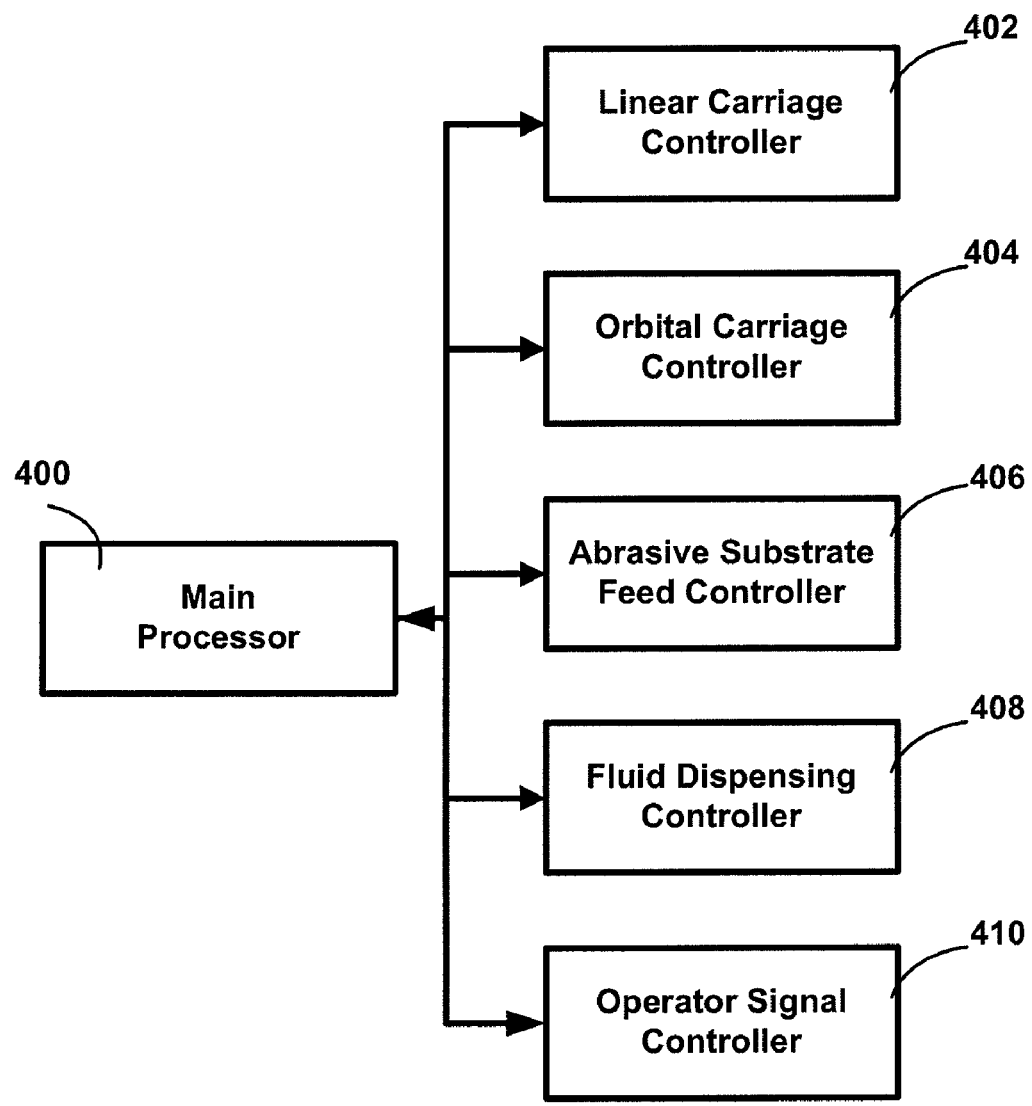
FIG. 15 is a block diagram for a main processor according to one illustrative embodiment.

Various types of controls may be incorporated into the shaping apparatus 100 to automate the processes of the apparatus. In one illustrative embodiment shown in FIG. 15, a main processor 400 may interact with and actuate one or more controllers.

A linear carriage controller 402 may provide an actuator control signal to control the linear movement of the tip shaper 60.

An orbital carriage controller 404 may provide a rotation control signal to the orbit motor 80 (see FIG. 3) to actuate rotation of the tip shaper in response to an actuator control signal.

An abrasive substrate feed controller 406 may provide a drive control signal to the drive mechanism to advance the abrasive substrate along the substrate support 72. The abrasive substrate feed controller 406 may provide a drive control signal to the drive motor 130 (FIG. 6) to unwind the abrasive substrate 70 from the first reel 90.

A fluid dispensing controller 408 may provide a fluid control signal to the fluid dispenser 94 to control and maintain the volume and timing of fluid dispensed onto the abrasive substrate 70.

An operator signaling controller 410 may be provided to inhibit the actuation of the apparatus 100 until it is positioned in a desired location. In one illustrative embodiment, the apparatus may be configured so that it cannot be actuated until the apparatus is aligned with an optical fiber. This may help to prevent inadvertent waste of the abrasive substrate 70. In one embodiment, a sensor may be located on the apparatus to determine whether an end of an optical fiber has been inserted into the opening 352 in the housing 350 (see FIG. 14). If the sensor does not detect an optical fiber, the operator will be unable to actuate the automated shaping process by actuating the trigger 354. However, once the sensor detects that an optical fiber has been inserted into the apparatus 100, the operator may initiate the automated process. In one embodiment, an indicator may be provided to signal the operator that he/she may actuate the process once an optical fiber has been inserted into the opening 352 in the housing 350. It should be appreciated that various types of sensors, such as proximity sensors and optical sensors, may be used as the present invention is not so limited.

Software or firmware may control the desired sequence of the automated operation of the shaping process. Although the specific sequence may be programmed for certain applications, the following sequence of automated operations is contemplated by the present invention. First, a sensor may detect when an optical fiber is positioned within opening 352 in the apparatus housing 350. A signal may then be sent to the operator via the indicator 360, to signal the operator that the shaping process may be initiated. Thereafter, the operator may actuate the automated cycle by actuating the trigger 354.

Once initiated, the main processor 400 may signal the tip shaper 60 to extend linearly to contact the end face of the optical fiber. The main processor 400 may also initiate the orbital rotation of the tip shaper 60 which may occur to shape the end of the optical fiber. If desired, the processor may also signal the dispensing of fluid onto the substrate 70 at predetermined intervals. The main processor 400 may also actuate advancement of the abrasive substrate 70 along the substrate support 72. Once the fiber is shaped with the abrasive substrate 70 to achieve the desired surface characteristics, the main processor 400 may signal the tip shaper 60 to return to its original orbital orientation, signal the fluid dispenser 94 to cease dispensing fluid, and/or signal the tip shaper 60 to retract away from the optical fiber 50. The main processor 400 may further provide a signal to cease the advancing of the abrasive substrate 70 and thereafter a signal may be sent to the operator via the indicator 360 to specify that the automated shaping process is completed so that the operator may remove the apparatus from the optical fiber.

It is contemplated that the apparatus 100 may be cordless and battery powered, and both the batteries and the main processor 400 may be located within the housing 350. However, it should be appreciated that it is also contemplated that components may reside outside of the housing 30 and/or that the apparatus may be powered by standard AC current.

Replaceable/Detachable Components

For some applications, it may be desirable for one or more components of the shaping apparatus 100 to be detachable and replaceable. For example, it may be desirable to replace the abrasive substrate 70 and/or the fluid dispenser 94 after they have been exhausted without having to replace the entire apparatus. This may be desirable to maximize the life of reusable components. It may also be desirable to replace the substrate support 72 to vary the desired optical fiber end face surface characteristics.

Figure 9:
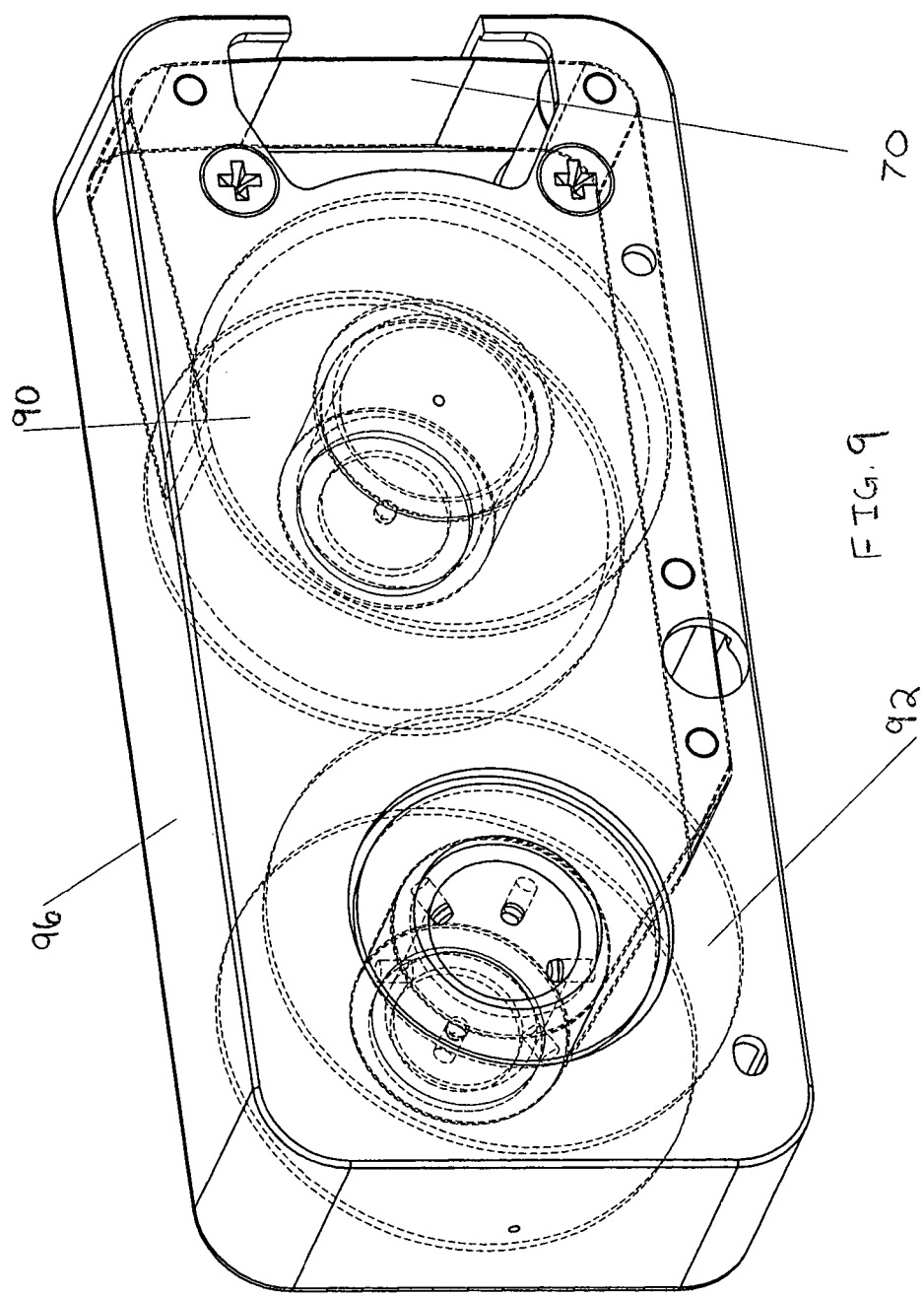
FIG. 9 is a perspective view of a cartridge for supporting an abrasive substrate included in the apparatus shown in FIG. 2.

In one illustrative embodiment shown in FIG. 9, the abrasive substrate 70 may be detachable and replaceable. For example, once the supply of the abrasive substrate 70 provided on the first reel 90 is exhausted, the used abrasive substrate 70 may be discarded and replaced with a fresh supply of abrasive substrate 70.

In the illustrative embodiment of FIG. 9, the abrasive substrate 70 may be contained within a cartridge 96. In this particular embodiment, the cartridge 96 supports the abrasive substrate 70, the first reel 90 and the second reel 92. In one illustrative embodiment, the cartridge 96 may be detachably coupled to the frame 20, and may for example be detachably coupled to the orbital carriage 80.

To insert a new abrasive substrate 70 into the apparatus, the operator may open a portion of the apparatus 100 to remove the spent abrasive substrate cartridge 96 and replace it with a new abrasive substrate cartridge. For example, in the embodiment illustrated in FIG. 14, the housing 350 includes an access door 356 with a handle 358 which enables an operator to access the cartridge 96. The replacement process may be similar to inserting a cassette into a cassette player. It is also contemplated that the cartridge 96 may include features which engage with features in the apparatus for a snap-fit. For example, as shown in the embodiment illustrated in FIGS. 4 and 7, the orbital carriage 80 may include one or more engagement clips 146 adapted to secure the cartridge in a snap-fit relationship.

In one embodiment, the support substrate 72 may be detachable and replaceable. The type of support substrate 72 may be chosen based upon the desired end face surface characteristics. A support surface 72 having a substantially rigid and flat support surface may be used to create a flat optical fiber end face. A substrate support 72 having a non-planar, non-rigid, and/or curved support surface may be used to create a non-planar or curved optical fiber end face. In one embodiment, the support substrate 72 may be contained with the cartridge 96 and may be replaceable when the cartridge 96 is removed from the housing 350.

In one embodiment, one or more portions of the fluid dispenser 94 may be detachable so that when the fluid source is depleted, a new supply of fluid may be added to the apparatus. It is contemplated that the fluid may be added to a chamber of the fluid dispenser (not shown). However, it is also contemplated that the apparatus may include a detachable fluid chamber or fluid cartridge.

It should be appreciated that various embodiments of the present invention may be formed with one or more of the above-described features. The above aspects and features of the invention may be employed in any suitable combination as the present invention is not limited in this respect. It should also be appreciated that the drawings illustrate various components and features which may be incorporated into various embodiments of the present invention. For simplification, some of the drawings may illustrate more than one optional feature or component. However, the present invention is not limited to the specific embodiments disclosed in the drawings. It should be recognized that the present invention encompasses embodiments which may include only a portion of the components illustrated in any one drawing figure, and/or may also encompass embodiments combining components illustrated in multiple different drawing figures.

It should be understood that the foregoing description of various embodiments of the invention are intended merely to be illustrative thereof and that other embodiments, modifications, and equivalents of the invention are within the scope of the invention recited in the claims appended hereto.

What is claimed is:

1. An apparatus for shaping an end of an optical fiber, the apparatus comprising:
   a frame;
   a clamp constructed and arranged to hold the optical fiber in a fixed location relative to the frame; and
   a tip shaper supported by the frame, the tip shaper being movable in a first direction toward and away from the clamp, and moveable in a second direction that lies in a plane transverse to the first direction to shape the end of the optical fiber when the tip shaper is placed in contact with the optical fiber, the tip shaper comprising an abrasive substrate to shape the end of the optical fiber and at least one substrate support that is supported by the frame, the abrasive substrate being advanceable along at least a portion of the substrate support.

2. The apparatus of claim 1, wherein the at least one substrate support includes a plurality of substrate supports constructed and arranged to provide different optical fiber shaping characteristics.

3. The apparatus of claim 1, wherein the clamp is supported by the frame.

4. The apparatus of claim 3, wherein the clamp is detachably coupled to the frame.

5. An apparatus for shaping an end of an optical fiber, the apparatus comprising:
   a frame;
   a clamp constructed and arranged to hold the optical fiber in a fixed location relative to the frame; and
   a tip shaper supported by the frame, the tip shaper being movable in a first direction toward and away from the clamp, and moveable in a second direction that lies in a plane transverse to the first direction to shape the end of the optical fiber when the tip shaper is placed in contact with the optical fiber, the tip shaper comprising an abrasive substrate to shape the end of the optical fiber, the abrasive substrate having at least a first region and a second region adjacent the first region, the first region having first abrasive properties and the second region having second abrasive properties that are different from the first abrasive properties to provide different shaping characteristics along the abrasive substrate.

6. The apparatus of claim 1, wherein the tip shaper further comprises a first reel and a second reel, wherein at least a portion of the abrasive substrate is unwound from the first reel as the abrasive substrate is advanced along a portion of the substrate support, and wherein at least a portion of the abrasive substrate is wound onto the second reel as the abrasive substrate is advanced along a portion of the substrate support.

7. The apparatus of claim 6, wherein the tip shaper further comprises a cartridge which supports the abrasive substrate, the first reel and the second reel, and wherein the cartridge is detachably coupled to the frame.

8. The apparatus of claim 1, wherein movement in the second direction includes orbital movement.

9. An apparatus for shaping an end of an optical fiber, the apparatus comprising:
   a frame;
   a clamp constructed and arranged to hold the optical fiber in a fixed location relative to the frame;
   a tip shaper supported by the frame and moveable relative to the frame to shape the end of the optical fiber when the tip shaper is placed in contact with the optical fiber, the tip shaper comprising an abrasive substrate to shape the end of the optical fiber and a substrate support that is supported by the frame, the abrasive substrate being advanceable along at least a portion of the substrate support; and
   a fiber support constructed and arranged to support an end portion of the optical fiber, the fiber support being movable along the end portion of the optical fiber in response to the tip shaper shaping the end of the optical fiber.

10. The apparatus of claim 9, wherein the fiber support has an axial passage adapted to receive the optical fiber therethrough, the fiber support being movable in an axial direction relative to the end portion of the optical fiber.

11. The apparatus of claim 9, wherein the tip shaper is movable in a first direction toward and away from the clamp and in a second direction that lies in a plane transverse to the first direction to shape the end of the optical fiber when the tip shaper is placed in contact with the optical fiber.

12. The apparatus of claim 9, wherein the fiber support is biased in a direction toward the tip shaper.

13. An apparatus for shaping an end of an optical fiber, the apparatus comprising:
   a frame;
   a clamp constructed and arranged to hold the optical fiber in a fixed location relative to the frame;
   a tip shaper supported by the frame and moveable relative to the frame to shape the end of the optical fiber when the tip shaper is placed in contact with the optical fiber, the tip shaper comprising an abrasive substrate to shape the end of the optical fiber, the abrasive substrate having at least a first region and a second region adjacent the first region, the first region having first abrasive properties and the second region having second abrasive properties that are different from the first abrasive properties to provide different shaping characteristics along the abrasive substrate; and
   a fiber support constructed and arranged to support an end portion of the optical fiber, the fiber support being movable along the end portion of the optical fiber in response to the tip shaper shaping the end of the optical fiber.

14. An apparatus for shaping an end of an optical fiber, the apparatus comprising:
   a frame;
   a clamp constructed and arranged to hold an optical fiber in a fixed location relative to the frame; and
   a tip shaper supported by the frame and moveable relative to the frame to shape an end of the optical fiber when the tip shaper is placed in contact with the optical fiber, the tip shaper including an abrasive substrate having at least a first region and a second region adjacent the first region, the first region having first abrasive properties and the second region having second abrasive properties that are different from the first abrasive properties to provide different shaping characteristics along the abrasive substrate.

15. The apparatus of claim 14, wherein the abrasive substrate has a third region adjacent the second region, the third region having third abrasive properties that are different from the first and second abrasive properties to provide different shaping characteristics along the abrasive substrate.

16. The apparatus of claim 15, wherein the abrasive substrate includes a first layer and a second layer disposed over the first layer, the second layer having a first opening extending therethrough to expose a portion of the first layer, the portion of the first layer forming the first region, at least a portion of the second layer forming the second region adjacent the first region; and
   wherein the abrasive substrate further includes a third layer disposed over of the second layer, the third layer having a second opening extending therethrough to expose a portion of the second layer, the portion of the second layer forming the second region, at least a portion of the third layer forming the third region adjacent the second region.

17. The apparatus of claim 14, wherein the abrasive substrate includes a first layer and a second layer disposed over the first layer, the second layer having a first opening extending therethrough to expose a portion of the first layer, the portion of the first layer forming the first region, at least a portion of the second layer forming the second region adjacent the first region.

* * * * *